(12) United States Patent
Dickens et al.

(10) Patent No.: US 6,657,525 B1
(45) Date of Patent: Dec. 2, 2003

(54) MICROELECTROMECHANICAL RF SWITCH

(75) Inventors: Lawrence E. Dickens, Baltimore, MD (US); Fred E. Sacks, Reisterstown, MD (US); Howard Fudem, Baltimore, MD (US); Don E. Crockett, Columbia, MD (US); Frank Lindberg, Baltimore, MD (US); Robert Young, Ellicott City, MD (US); Gregory DeSalvo, Bellbrook, OH (US)

(73) Assignee: Northrop Grumman Corporation, Los Angeles, CA (US)

( * ) Notice: Subject to any disclaimer, the term of this patent is extended or adjusted under 35 U.S.C. 154(b) by 4 days.

(21) Appl. No.: 10/157,935

(22) Filed: May 31, 2002

(51) Int. Cl.$^7$ ............................................. H01H 51/22
(52) U.S. Cl. ......................... 335/78; 361/233; 200/181
(58) Field of Search ............................ 335/78–86, 128; 200/181; 257/414, 421, 531, 417–18; 361/233, 234

(56) References Cited

U.S. PATENT DOCUMENTS

| | | | |
|---|---|---|---|
| 5,635,739 A | * | 6/1997 | Grieff et al. ................. 257/417 |
| 5,929,497 A | * | 7/1999 | Chavan et al. ............... 257/417 |
| 6,100,477 A | | 8/2000 | Randall et al. |
| 6,143,997 A | | 11/2000 | Feng et al. |
| 6,307,452 B1 | | 10/2001 | Sun |
| 6,331,257 B1 | | 12/2001 | Loo et al. |
| 6,373,007 B1 | * | 4/2002 | Calcatera et al. ........... 200/181 |

* cited by examiner

Primary Examiner—Tuyen T. Nguyen
(74) Attorney, Agent, or Firm—Birch, Stewart, Kolasch & Birch, LLP (57) ABSTRACT

A MEMS switch having spaced-apart RF conductors on a substrate with a bridge structure disposed above the substrate. In one embodiment the bridge structure has two flexible arms supported by two support members and in another embodiment the bridge structure has three flexible arms supported by three support members, the third support member being electrically integral with the second conductor. The bridge structure is drawn down to effect electrical contact between the first and second conductors by application of a control signal to a control electrode, having an opposed electrode on the undersurface of the bridge structure. A central stiffener portion of the bridge prevents any contact between the control and opposed electrodes.

16 Claims, 12 Drawing Sheets

MICROELECTROMECHANICAL RF SWITCH

STATEMENT OF GOVERNMENT INTEREST

The Government has rights in this invention in accordance with a contract with the Department of Defense.

BACKGROUND OF THE INVENTION

1. Field of the Invention

The invention in general relates to miniature switches, and more particularly, to a MEMS switch useful in radar and other microwave applications.

2. Description of Related Art

A variety of MEMS (microelectromechanical systems) switches are in use, or proposed for use, in radar, as well as other high frequency circuits for controlling RF signals. These MEMS switches are popular insofar as they can have a relatively high off impedance and a relatively low on impedance, with a low off capacitance, leading to desirable high cutoff frequencies and wide bandwidth operation. Additionally, the MEMS switches have a small footprint and can operate at high RF voltages.

Many of these MEMS switches generally have electrostatic elements, such as opposed pull down control electrodes, which are attracted to one another upon application of a DC control signal. One of these DC control electrodes is on a substrate and an opposing electrode, having a dielectric coating, is positioned on the underside of a moveable bridge above the substrate. Upon application of the DC control signal the bridge is drawn down and an electrical contact on the underside of the bridge completes the electrical circuit between first and second spaced apart RF conductors on the substrate.

As will be described, for this type of design there is a possibility of stiction. Stiction is a condition wherein a charge is built up in the dielectric upon touching the opposed control electrode. When the control voltage is removed there may be enough charge built up such that there is still an attraction and the switch will remain closed, even though it is supposed to be open. Further, under such condition, at the point of closure of the control electrodes an ultra-high field exists which can lead to contact erosion.

It is an object of the present invention to provide a MEMS switch which eliminates the possibility of stiction. It is a further object to provide a MEMS switch which is highly reliable, has low RF losses and a high operating bandwidth.

SUMMARY OF THE INVENTION

A MEMS switch is provided which has a substrate member with first and second spaced-apart conductors deposited on the substrate. A bridge structure, including a central stiffener portion, is disposed above the substrate and has a plurality of flexible arms connected to respective ones of a plurality of support members. At least one control electrode is deposited on the substrate for receiving a DC control signal to activate the switch to a closed position. The bridge structure has an undersurface including at least one metallic area for forming an opposed electrode portion facing the control electrode, for electrostatic attraction upon application of the DC control signal. The bridge structure, upon application of the DC control signal, is drawn down, by the electrostatic attraction, to complete an electrical circuit between the first and second conductors. The central stiffener portion is of a material to resist bending in a manner that, when said bridge structure is drawn down completing the electrical circuit, there is no contact between the control electrode and the opposed electrode portion. Additionally, the switch is fabricated such that there is no dielectric material in the area of the opposed electrode facing the control electrode.

Further scope of applicability of the present invention will become apparent from the detailed descriptions provided hereinafter. It should be understood, however, that the detailed descriptions and specific examples, while disclosing the preferred embodiments of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only. In addition, the use of spatial terms such as top, bottom, above, below etc. is for ease of explanation and not as structural or orientation limitations.

FIG. 10Aa is a plan view of a component of FIG. 10A.

DESCRIPTION OF THE PREFERRED EMBODIMENTS

Figure 1A:
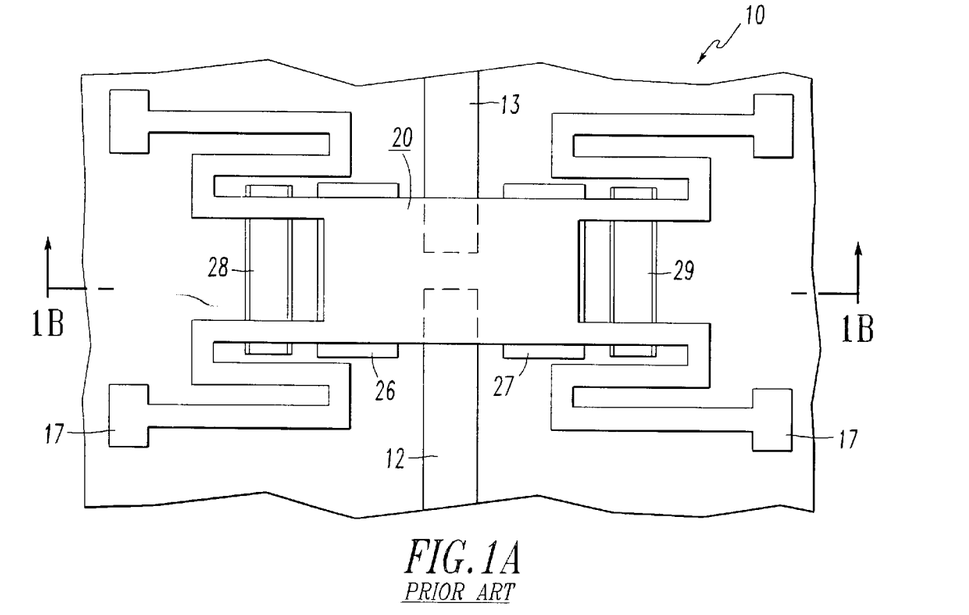
FIG. 1A is a plan view of a prior art MEMS switch.
Figure 1B:
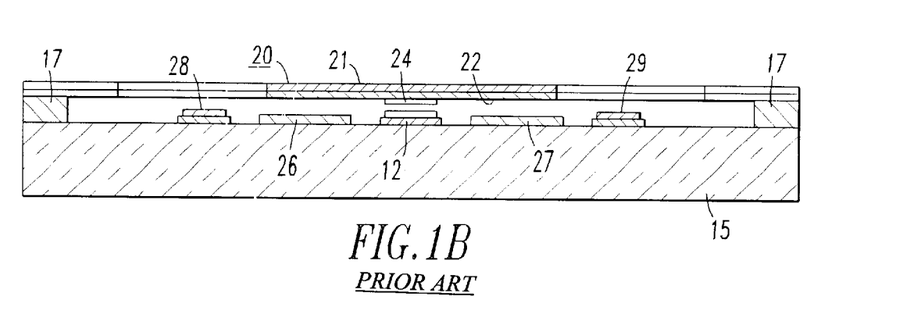
FIG. 1B is a view of the switch of FIG. 1A along lines 1B—1B, in the open position.
Figure 1C:
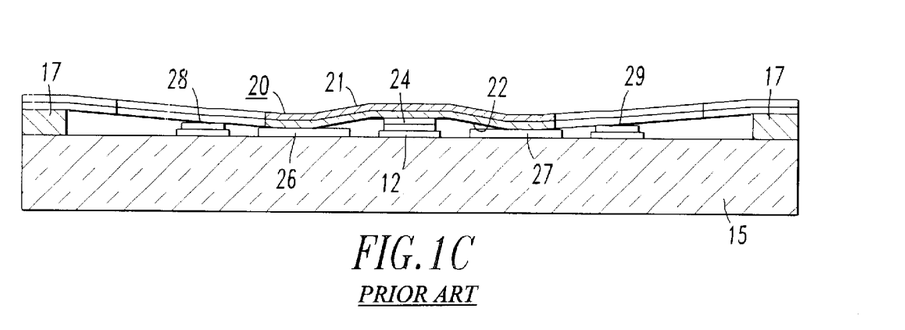
FIG. 1C is a view of the switch of FIG. 1A along lines 1B—1B, in the closed position.

Referring to FIGS. 1A–C, there is illustrated an example of one type of MEMS switch 10. The switch 10, shown in an open position in FIG. 1B, includes first and second spaced-apart conductors 12 and 13 for conduction of current when the switch is activated to a closed position. The particular activation mechanism includes a flexible bridge, supported at anchors 17, and comprised of a metal top 21 and a dielectric undersurface 22.

The bridge 20 includes a contact 24 on its undersurface for making electrical contact with both conductors 12 and 13 to complete the electrical circuit for signal transmission. This is accomplished with the provision of pulldown, or control electrodes. More particularly, the arrangement includes electrodes 26 and 27 to which is applied a DC control signal. Metal portions of the bridge 20 act as respective opposed electrodes, i.e., a DC return.

Upon application of the DC control signal, the switch 10 closes, as bridge 20 is pulled down to the position shown in FIG. 1C by electrostatic attraction of the control electrode arrangement. Bumpers, or stops 28 and 29 limit further movement of the bridge 20.

In the operation of such switch, a problem may arise in that when in a closed position, as in FIG. 1C, a dielectric, 22, is positioned between metals 21 and 26, and 21 and 27, potentially leading to a stiction situation. Stiction is the condition wherein the switch remains in a closed position for a period of time after the control signal has been removed. This condition is caused by a charge build-up in the dielectric 22, and which charge build-up continues the electrostatic attraction, even after the control signal has been removed.

In addition, extremely high fields exist at the point of closure of the control electrodes. This can lead to high field erosion of the metal constituting the control electrode arrangement.

Figure 2A:
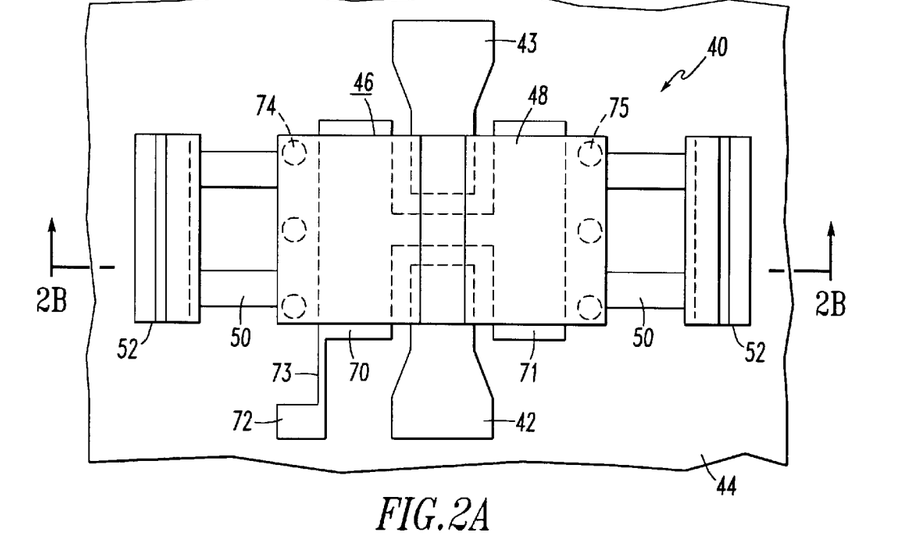
FIG. 2A is a plan view of a MEMS switch in accordance with one embodiment of the present invention.
Figure 2B:
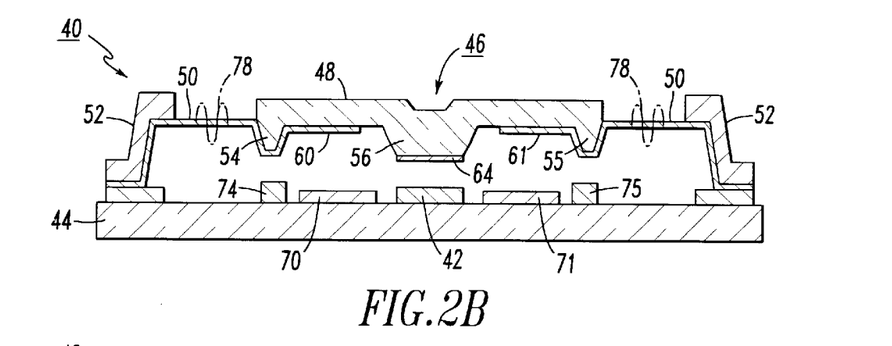
FIG. 2B is a view of the switch of FIG. 2A along lines 2B—2B, in the open position.
Figure 2C:
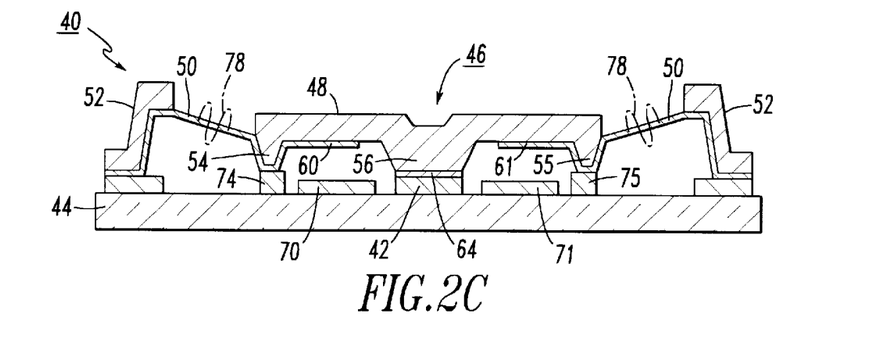
FIG. 2C is a view of the switch of FIG. 2A along lines 2B—2B, in the closed position.

FIGS. 2A–C illustrate one embodiment of the present invention which completely eliminates these problems. The improved MEMS switch 40 illustrated in FIGS. 2A–C includes first and second spaced apart RF conductors 42 and 43 deposited on a substrate 44, such as alumina or sapphire, by way of example.

Positioned above the substrate 44, and above the first and second conductors 42 and 43, is a bridge structure 46 having a central stiffener portion 48. The central stiffener portion 48 is vertically moveable by virtue of metallic flexible spring arms 50 connected to respective support members 52.

The central stiffener portion 48 includes depending edge segments 54 and 55, as well as a depending middle segment 56. The metallized portion of the bridge structure 46 forming spring arms 50, extends partially across the undersurface of central stiffener portion 48, forming respective electrode sections 60 and 61. In addition, the undersurface of depending middle segment 56 includes an electrical contact 64 which completes the electrical connection between first and second RF conductors 42 and 43 when the switch 40 is activated. This contact 64 which completes the RF electrical circuit may be either metallic or a capacitive type connection.

Activation of the switch is accomplished with the provision of a pulldown, or DC control electrode arrangement. In FIGS. 2A–C, this DC control electrode arrangement includes electrically connected DC electrodes 70 and 71, deposited on substrate 44, in conjunction with opposed electrode sections 60 and 61, on the underside of central stiffener portion 48, without the intervention of any dielectric. The absence of a dielectric also eliminates the problem of dielectric charging by cosmic rays, if the switch is used in an outer space application.

A DC voltage may be applied to electrodes 70 and 71, via input pad 72 to activate the switch, with opposed electrodes 60 and 61 forming a connection to ground, via support members 52. With this design the RF and DC circuits are completely isolated from one another. This isolation is further aided in this, as well as subsequent embodiments, by making the line 73 from pad 72 to electrode 70, very thin and of a high resistance material, so as to impart a high resistance to RF currents.

Electrostatic attraction between opposed electrodes 60/70 and 61/71 causes the bridge structure 46 to assume the position illustrated in FIG. 2C whereby the switch is closed by contact 64 electrically connecting first and second conductors 42 and 43. In this regard, stoppers 74 and 75 may be included to limit downward movement of the central stiffener portion 48.

When the switch is activated by application of a DC control voltage, depending edge segments 54 and 55 make physical contact with respective stoppers 74 and 75 at the same time as contact 64 makes contact with the RF conductors. Because of continued electrostatic attraction between opposed control electrodes, the contact 64 is pushed further in the middle, ensuring that good resistive (or capacitive) contact is made to the RF conductors 42 and 43.

The central stiffener portion 48 of bridge structure 46 is sufficiently rigid so as to prevent any significant bending, thus ensuring that opposed control electrodes never touch one another, with continued application of the DC control signal. This central stiffener portion 48 may be made of a stiff metal, however, to achieve even more rapid switching speeds, the central stiffener portion 48 is preferably made of a rigid lightweight, low density material, such as a silicon oxide in the form of silicon monoxide or silicon dioxide, by way of example. Although silicon monoxide and silicon dioxide are dielectrics, the central stiffener portion 48 is not positioned between two metals, and no charging effect can take place.

If size is of a critical consideration, the lateral dimension of the switch 40 may be reduced by providing spring arms 50 with undulations, as depicted by phantom lines 78. These undulations will enable the spring arms 50 to be shorter, while still maintaining the same restoring forces on the bridge structure 46.

Figure 3A:
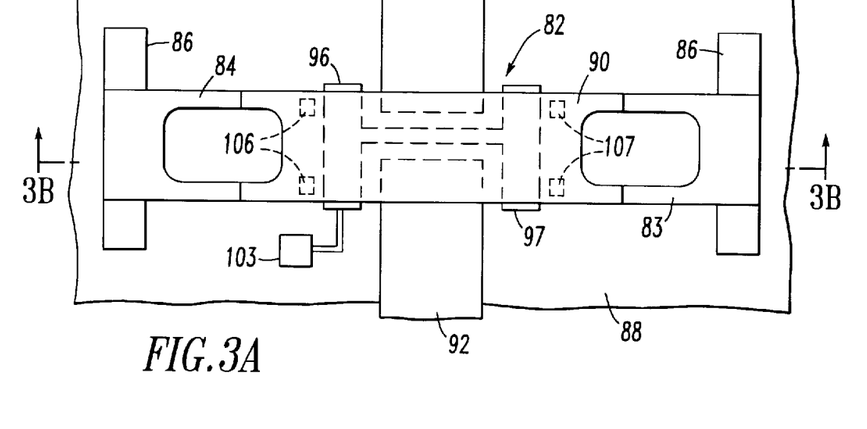
FIG. 3A is a plan view of a MEMS switch in accordance with another embodiment of the present invention.

Switch 40, like many MEMS switches, may be fabricated using conventional integrated circuit fabrication techniques well-known to those skilled in the art. The fabrication process may be greatly simplified by utilizing a design as illustrated in FIGS. 3A–C, generally corresponding to the views of FIGS. 2A–C.

Figure 3B:
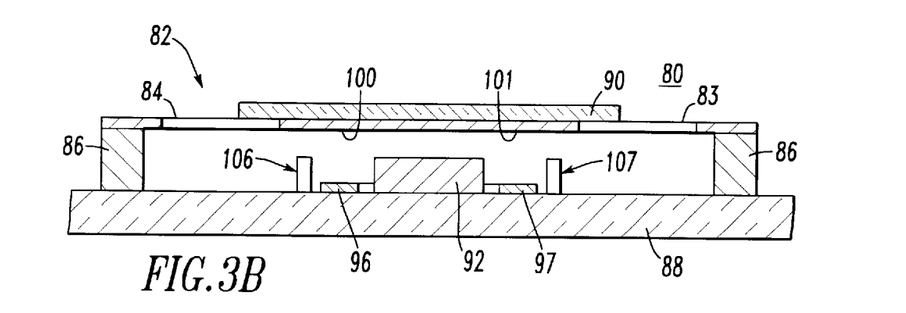
FIG. 3B is a view of the switch of FIG. 3A along lines 3B—3B, in the open position.
Figure 3C:
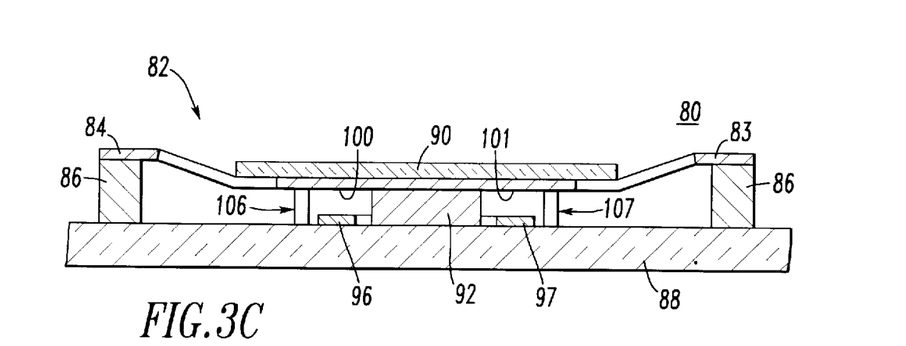
FIG. 3C is a view of the switch of FIG. 3A along lines 3B—3B, in the closed position.

As best seen in FIGS. 3B and 3C, switch 80 includes bridge structure 82 having an essentially flat metallic bridge member 83 having a flexible flat metal arm member 84, bifurcated on either end and extending between supports 86 which are disposed on a substrate 88. The bridge structure 82 has a central stiffener portion 90 which is also flat and which is positioned on metal bridge member 83 above RF conductors 92 and 93 on substrate 88.

The DC control electrode arrangement includes electrodes 96 and 97 electrically connected together and positioned on either side of the conductors 92 and 93. Opposed electrodes for electrostatic attraction are constituted by respective portions 100 and 101 of the metal arm directly above respective electrodes 96 and 97, and connected to a DC ground (not illustrated). Activation of the switch 80 to a closed position, as in FIG. 3C, is accomplished by a DC control signal applied to input pad 103 (FIG. 3A).

Downward movement of bridge structure 82 is limited by the presence of conductors 92 and 93, as well as stoppers 106 and 107, which extend above substrate 88 to a position higher than DC electrodes 96 and 97, and substantially even with conductors 92 and 93. With this construction, during operation, the metallic bridge member 83 never touches control electrodes 96 and 97.

It is generally an object in the design of MEMS switches to provide a device that has the highest possible impedance when in the off state (switch open), and the lowest possible impedance when in the on state (switch closed). This not only provides for a higher ratio of output to input power, that is, lower loss over an operating frequency range, but also allows for a higher ratio of cutoff frequency-to-operating frequency.

Figure 4A:
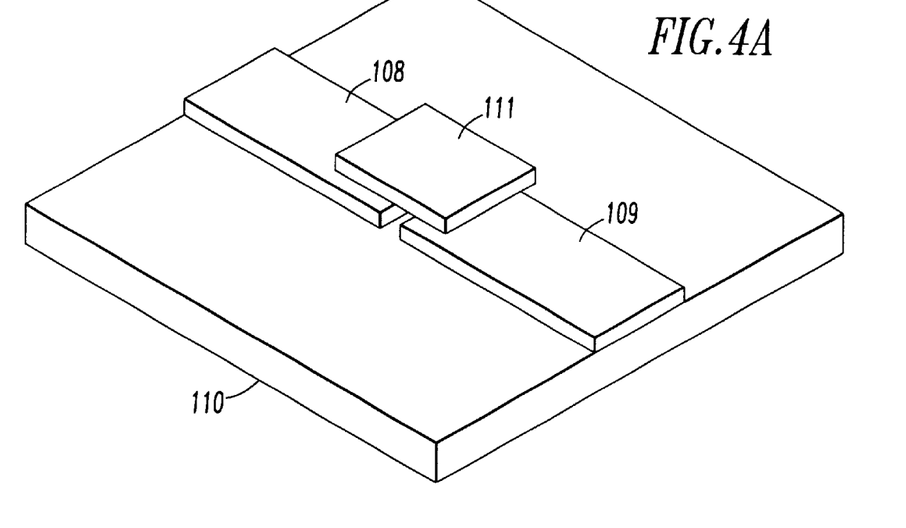
FIG. 4A is an isometric view of some basic components of a switch with a contact member above two conductors.
Figure 4B:
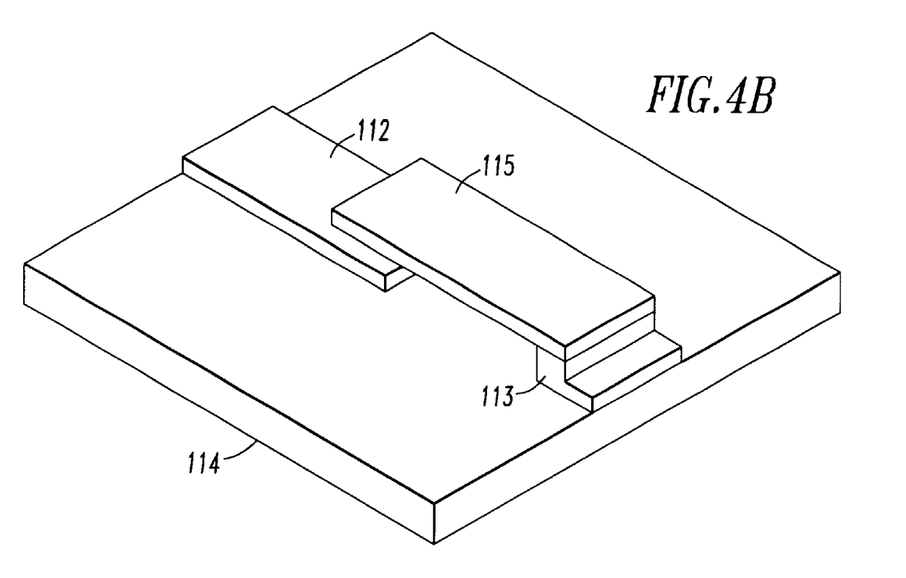
FIG. 4B is an isometric view of some basic components of a switch with a contact member above one conductor and electrically integrated with the other conductor.

FIGS. 4A and 4B illustrate basic components of two types of MEMS switch configurations, and FIGS. 5A to 5H illustrate the resistive and capacitive effects during operation of the switches.

The switch of FIG. 4A includes first and second spaced apart RF conductors 108 and 109 on a substrate 110, with a contact member 111 disposed over both conductors. This structure is basically of the type described in FIGS. 2A–C and 3A–C.

The switch of FIG. 4B affords some advantages in reducing RF losses and is of the type to be subsequently described in FIGS. 7A–C to 9A–C. The switch of FIG. 4B includes first and second RF conductors 112 and 113 on a substrate 114, with a contact member 115 disposed over conductor 112 and being electrically integrated with conductor 113.

Figure 5A:
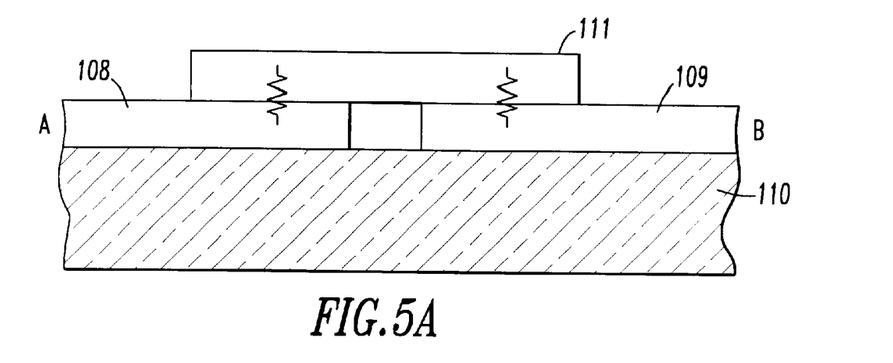
FIGS. 5A to 5H are figures to illustrate the advantages and disadvantages of the switch designs of FIGS. 4A and 4B.
Figure 5B:
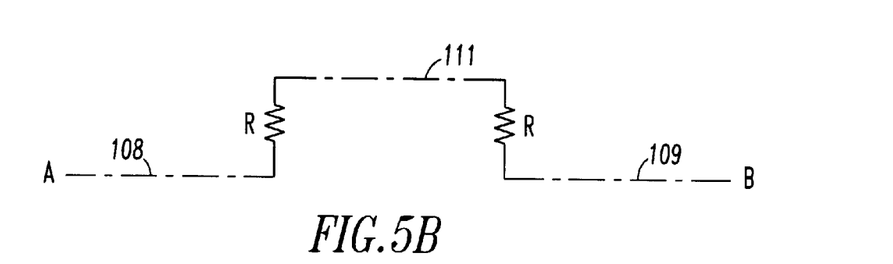

FIG. 5A illustrates the switch of FIG. 4A in a closed position and FIG. 5B is the corresponding resistive electrical representation. Let it be assumed that, between conductor 108 and contact 111, and between contact 111 and conductor 109, there is the series connection of two resistors, each of a resistance R, as depicted in FIG. 5B. The total resistance therefore, between points A and B is 2R.

Figure 5C:
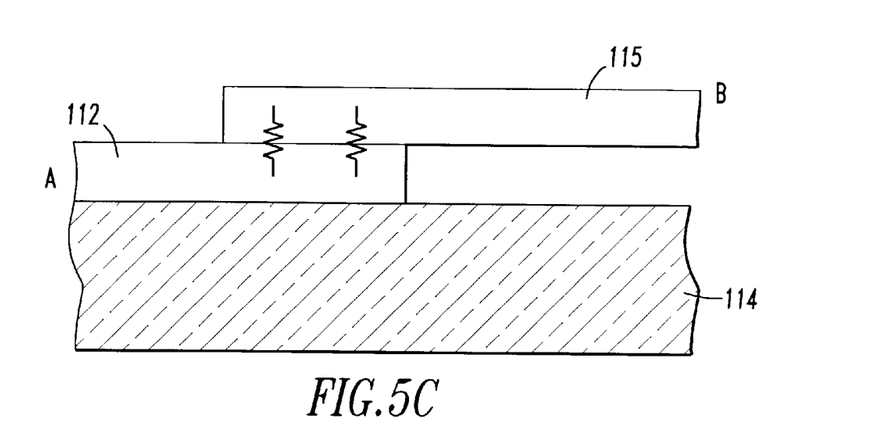
Figure 5D:
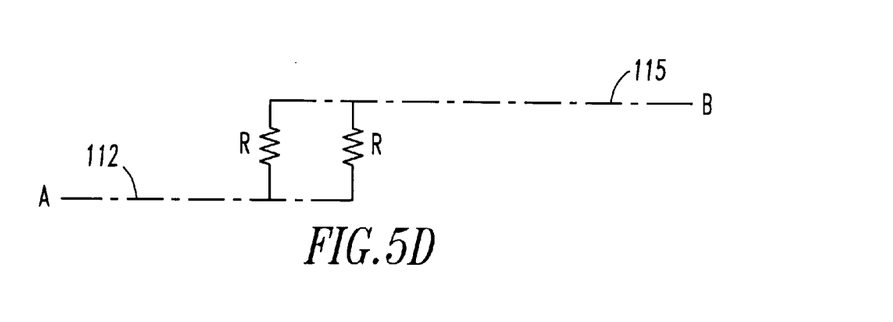

With the arrangement of FIG. 4B, and as illustrated in FIG. 5C, the two resistors are now connected in parallel, as depicted in FIG. 5D. With two resistors in parallel, the resulting resistance between points A and B is R/2, a fourfold reduction in resistance as compared with the structure of FIG. 4A. This reduction in resistance significantly reduces RF losses.

Figure 5E:
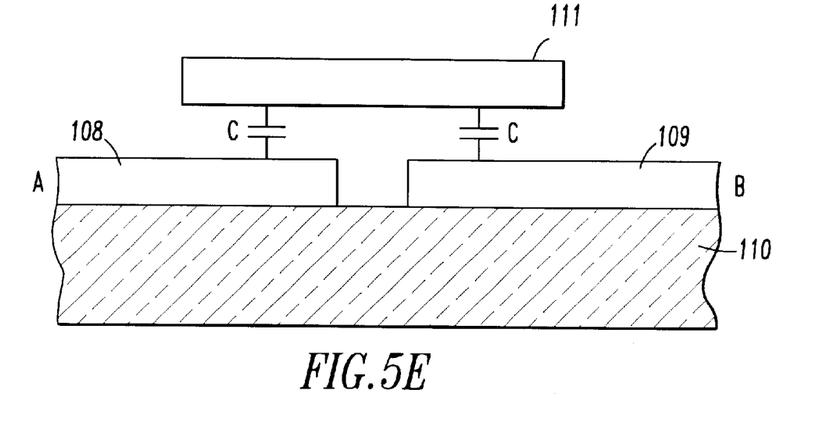
Figure 5F:
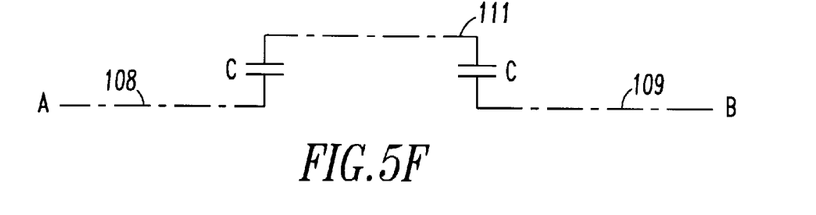

With respect to the capacitive aspects of the two arrangements, FIG. 5E illustrates the switch of FIG. 4A in an open condition, with the capacitive electrical representation being shown in FIG. 5F. It is seen that two capacitors each of a value C are connected in series resulting in a total capacitance of C/2 between points A and B.

Figure 5G:
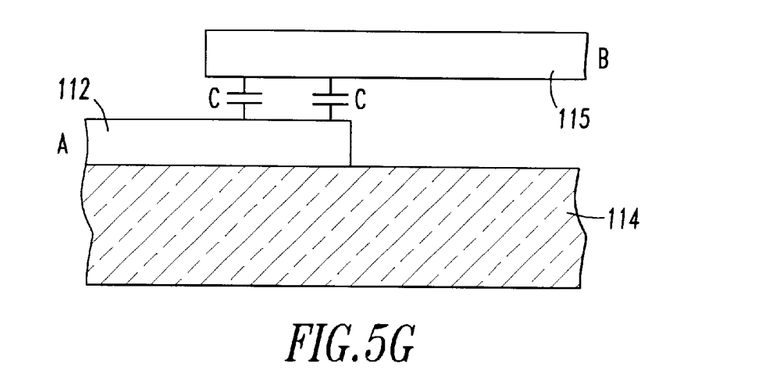
Figure 5H:
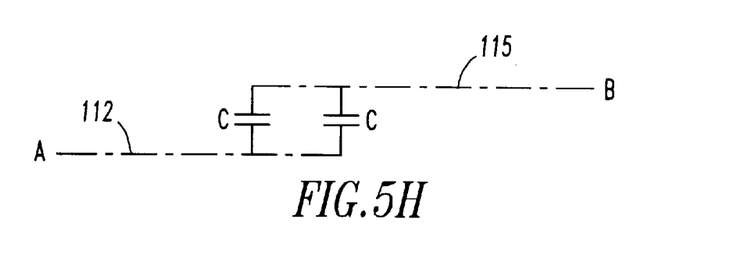

With the arrangement of FIG. 4B, and as illustrated in FIGS. 5G and 5H, the capacitors are now in parallel resulting in a total capacitance of 2C between points A and B. This increase in capacitance leads to an undesired decrease in open circuit impedance, however this is offset in the present invention by designing the MEMS switches with extremely small contact areas, which has the effect of reducing fringe capacitance.

Figure 6A:
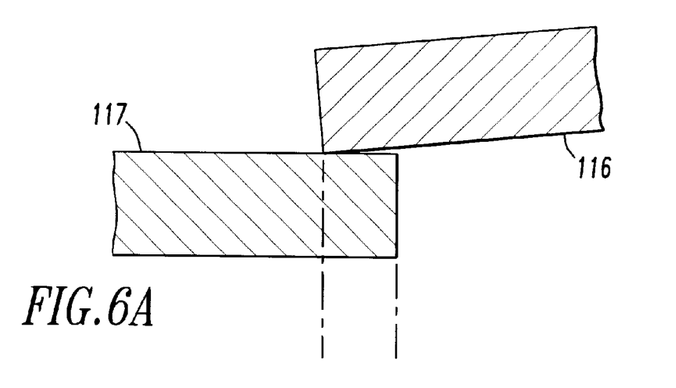
FIGS. 6A and 6B are side views of a contact member, as in FIG. 4B, making contact with a conductor.
Figure 6B:
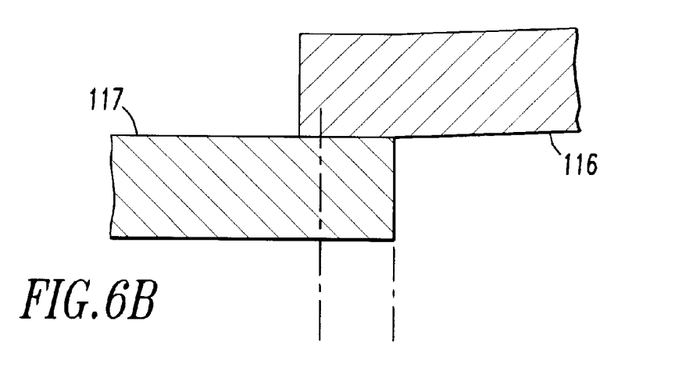
Figure 6C:
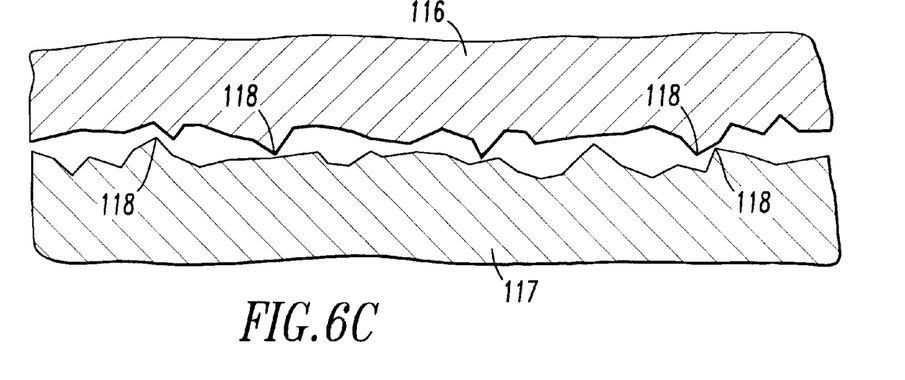
FIG. 6C is a view of asperities of the actual contact surfaces.

Another benefit of the arrangement of FIG. 4B is illustrated in FIGS. 6A–C. In FIG. 6A a DC control signal has been applied and a contact member 116 is drawn down to the point of just touching conductor 117. During the application of the control signal, contact member 116 is drawn down further so as to move to the left, as in FIG. 6B, thus providing a wiping action. This wiping action provides a continuous cleaning of the mating surfaces and assures good electrical contact.

It is to be noted that in actuality, the mating surfaces are not totally flat but rather, on a microscopic level, include asperities as illustrated in FIG. 6C. The surfaces of both the contact member 116 and conductor 117 include asperities or protrusions 118 preventing a desired totally flat surface-surface contact. The wiping action of the design, as in FIG. 4B, aids in smoothing the surfaces during continued operation, thus reducing resistive losses of the switch.

Figure 7A:
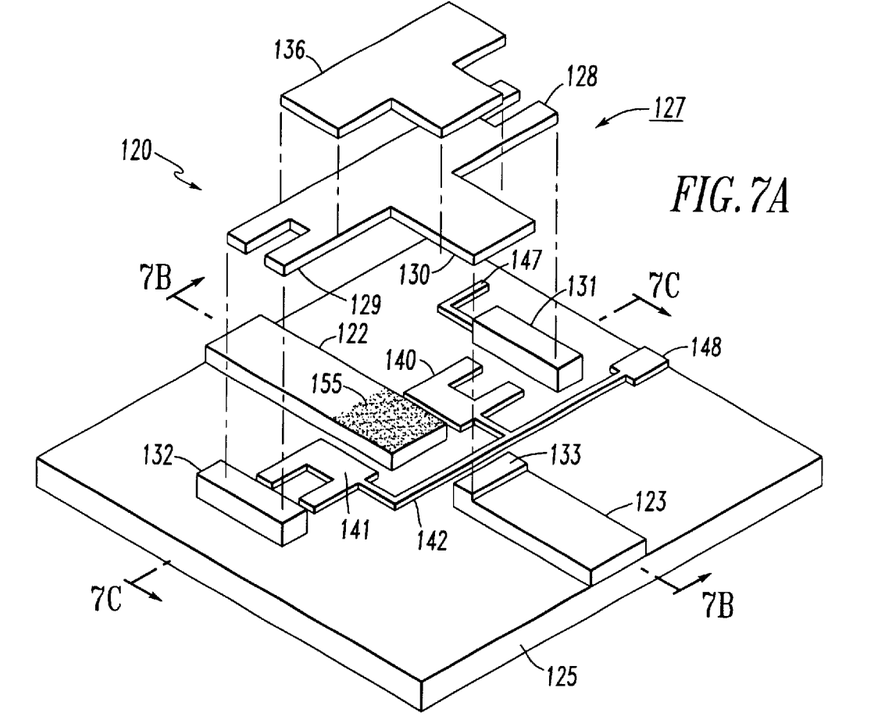
FIG. 7A is an exploded view of another embodiment of the present invention.
Figure 7B:
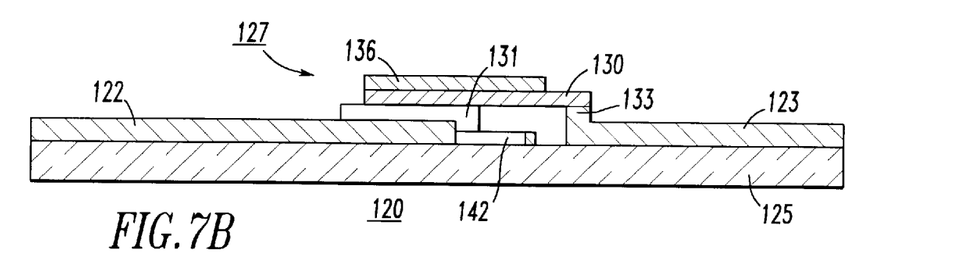
FIG. 7B is a view along line 7B—7B of FIG. 7A.
Figure 7C:
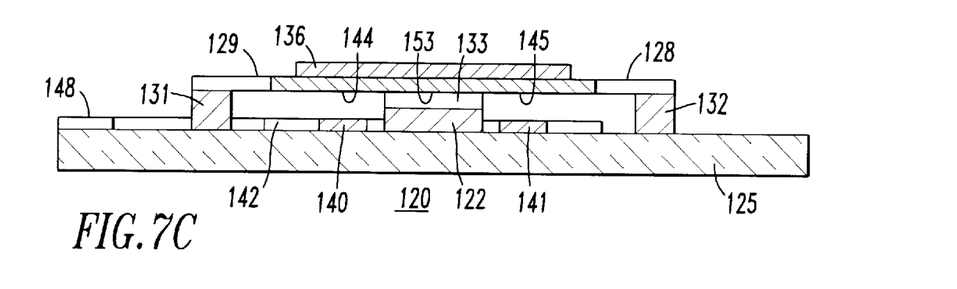
FIG. 7C is a view along line 7C—7C of FIG. 7A.

FIGS. 7A–C illustrate an embodiment of the present invention based upon the principles of the switch of FIG. 4B. In FIGS. 7A–C, switch 120 includes first and second RF conductors 122 and 123 deposited on a substrate 125. Suspended above the conductors is a metallic bridge structure 127 having a plurality of arms 128, 129 and 130, connected to respective support members 131, 132 and 133, with this latter support member 133 being formed on the end of conductor 123 which faces conductor 122. In accordance with the present invention, the bridge structure 127 includes a central stiffener portion 136, which may be of a silicon oxide, as previously described.

In order to impart greater flexibility to the bridge structure 127, at least the laterally extending arms 128 and 129 may be bifurcated, as illustrated. The support members 131 to 133, to which the arms are connected, are electrically conducting members such that the bridge structure 127 is suspended over conductor 122, but is electrically integral with conductor 123, by virtue of electrically conducting support member 133.

The DC control electrode arrangement includes separated electrodes 140 and 141 on substrate 125 with the electrodes being electrically connected together by conducting trace 142. Electrodes 140 and 141 are positioned on either side of conductor 122 at the end thereof. Opposed electrodes for electrostatic attraction are constituted by respective portions 144 and 145 of the metal arms directly above respective electrodes 140 and 141, and connected to a DC ground via trace 147 by the path including arm 128 and support member 131. Activation of the switch 120 to a closed position is accomplished by a DC control signal applied to input pad 148.

It is noted that switch 120, as well as subsequent embodiments, does not include stoppers as in FIGS. 2 and 3. Stoppers may be used in some designs to limit downward movement of the bridge structure so as to avoid opposed DC control electrodes from touching one another and shorting out. Upon application of the DC control signal, the electric field generated force causes the bridge structure to move downward. When the voltage (and therefore the force) is sufficient, the bridge structure will snap down and make contact with the RF conductor(s). This voltage is called the pull-in voltage. To increase the speed with which the closing action takes place, the applied control voltage may be increased to typically 1.5 times the pull-in voltage, which may be considered within the normal range of applied control signal.

If the voltage is further increased, the force may be sufficient to bend the bridge structure to short out the control electrodes. This voltage is called the second pull-in voltage. The margin between the pull-in voltage and second pull-in voltage may be increased with the provision of stoppers, however with many designs the provision of the central stiffener portion of the bridge structure is sufficient to prevent this shorting when DC control signals within a normal range are applied.

When switch 120 is activated to a closed position, the metallized underportion 153 of bridge structure 127 bears down on a contact area 155 (shown stippled) of conductor 122 to complete the RF circuit between conductors 122 and 123. In order to improve isolation, and therefore lower RF losses when the switch is open, it is desired that this contact area be as small as practical, while still being able to maintain low ON resistance and concomitantly support the power handling requirements of the application.

In addition, the loss associated with the contact area is a function of the force that can be exerted due to the electric field generated by the applied DC control voltage. A greater contact force will result in a lower resistance contact. This may be accomplished by providing a larger total area of DC control electrode on the substrate. The embodiment of the present invention illustrated in FIGS. 8A–C meets these objectives of smaller contact area and larger DC control electrode.

Switch 160 includes first and second RF conductors 162 and 163 deposited on substrate 165. As compared with conductor 122 in FIGS. 7A–C, conductor 162 is foreshortened at its distal end 168, resulting in a relatively small contact area 170 with bridge structure 172 when it is activated to close the switch.

The DC control electrode arrangement includes electrode 174 deposited on substrate 165 in a manner that it partially surrounds the end of conductor 162. That is, electrode 174 is adjacent the sides of conductor 162 in the vicinity of contact area 170 and extends completely around the front of conductor 162 resulting in a greater electrode area as compared with that of FIGS. 7A–C.

Since the attractive force is directly proportional to the area of the control electrode 174, this allows either a smaller DC control voltage to be applied to pad 176 to achieve the same force, or with the same applied DC control voltage as in FIGS. 7A–C, a greater force will be applied, lowering the contact resistance, with a consequent reduction in RF losses.

Figure 8A:
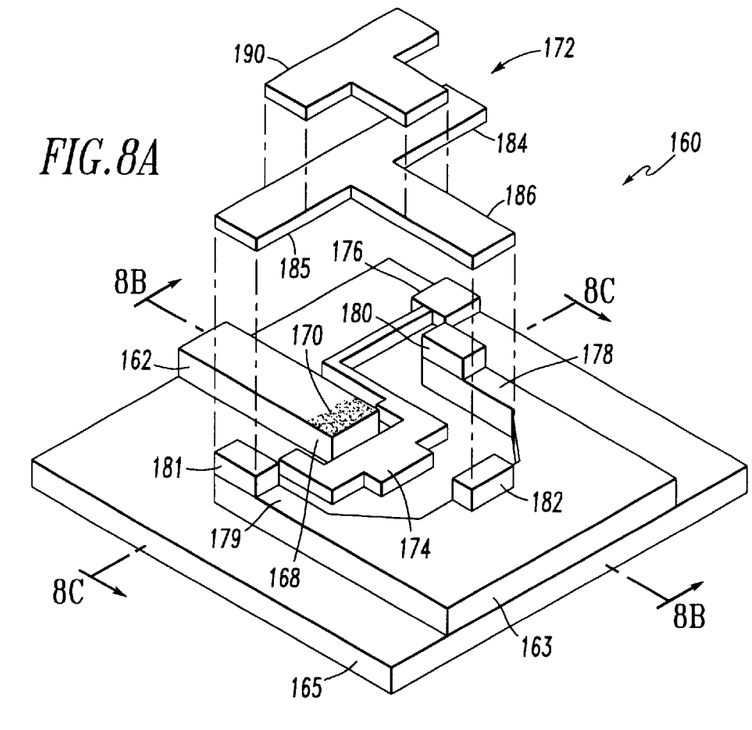
FIG. 8A is an exploded view of another embodiment of the present invention.

RF losses are further reduced by the novel design of the second conductor 163. The conductors for these MEMS switches are actually small transmission lines having a characteristic impedance. In many RF circuits a 50 Ohm transmission line is common, and conductor 163 represents such 50 Ohm transmission line. Direct connection to an adjacent 50 Ohm transmission line may be made without any losses or the conductor may be tapered to match a higher impedance line.

Figure 8B:
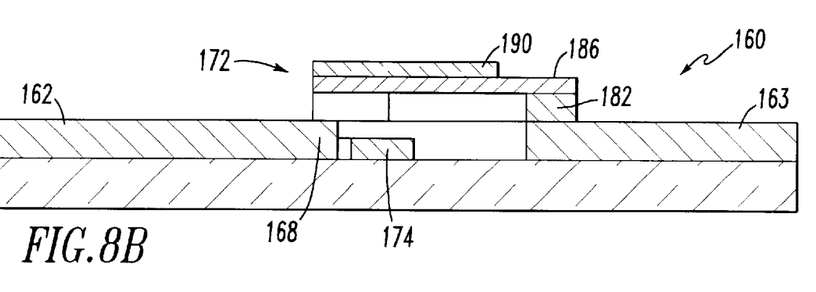
FIG. 8B is a view along line 8B—8B of FIG. 8A.
Figure 8C:
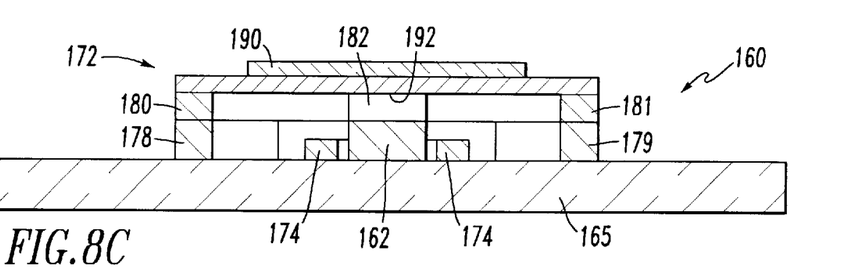
FIG. 8C is a view along line 8C—8C of FIG. 8A.

Conductor 163, which also serves as a DC ground, is bifurcated and includes two end segments 178 and 179 electrically connected to respective support members 180 and 181. A third electrically conducting support member 182 is positioned on the conductor 163 at a position aligned with conductor 162. These support members 180, 181 and 182 respectively support arms 184, 185 and 186 of bridge structure 172, which also, in accordance with the present invention, includes a central stiffener portion 190.

When switch 160 is activated to a closed position by application of a DC control signal to pad 176, the electrostatic attraction between DC electrode 174 and opposed electrode portion 192 of the underside of metal bridge structure 172 causes bridge structure 172 to snap down to make contact with contact area 170. RF current then flows into conductor 163 through three parallel paths comprised of segment 178, via arm 184, segment 179, via arm 185 and through the central portion of conductor 163, via arm 186. Each path presents a certain resistance, however the equivalent resistance of three paths in parallel is smaller than any single path. Therefore the conductor design reduces resistance and lowers RF losses.

Figure 9A:
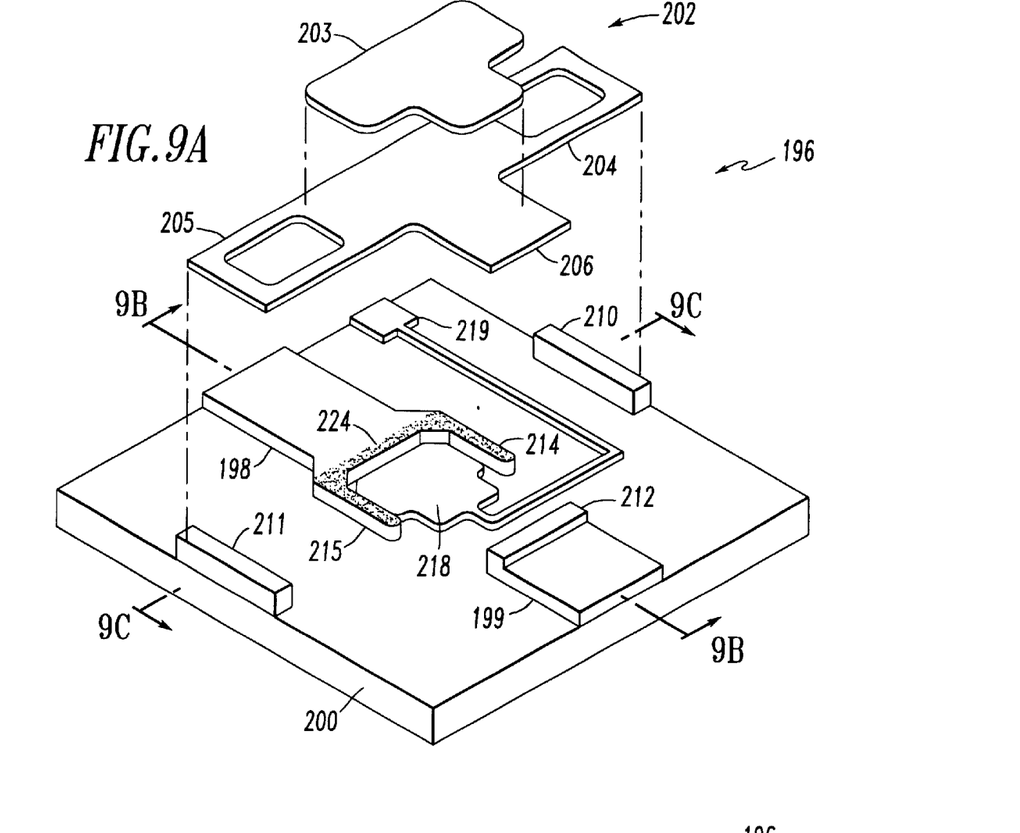
FIG. 9A is an exploded view of another embodiment of the present invention.
Figure 9B:
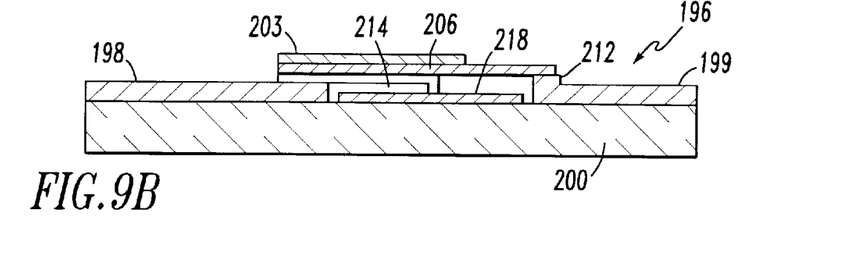
FIG. 9B is a view along line 9B—9B of FIG. 9A.
Figure 9C:
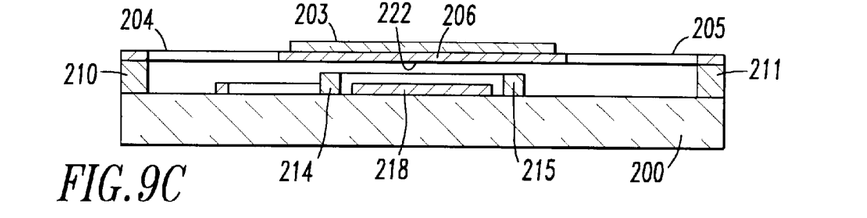
FIG. 9C is a view along line 9C—9C of FIG. 9A.

Switch 196 in FIGS. 9A–C, includes a first conductor 198, which is bifurcated at its distal end, and a second conductor 199 deposited on substrate 200. Bridge structure 202, having central stiffener portion 203, includes arms 204, 205 and 206 connected to respective electrically conducting support members 210, 211 and 212. This latter support member 212 is electrically integral with second conductor 199. With this arrangement bridge structure 202 is suspended above segments 214 and 215 of the bifurcated end of conductor 198.

Positioned between segments 214 and 215 of conductor 198 is the DC control electrode 218 having a relatively large area, and connected to pad 219 to which a DC control signal is applied to activate the switch to a closed position. When the DC control signal is provided, the electrostatic attraction between electrode 218 and the opposed electrode portion 222 on the underside of bridge structure 202 rapidly brings the bridge structure 202 into electrical contact with contact area 224, to thus complete the RF circuit. The relatively small contact area 224 (shown stippled), in conjunction with the relatively large area control electrode 218 ensures that fringe capacitance is small and that the closing force is sufficiently high to minimize contact resistance, so that switch 196 has low RF losses.

Figure 10:
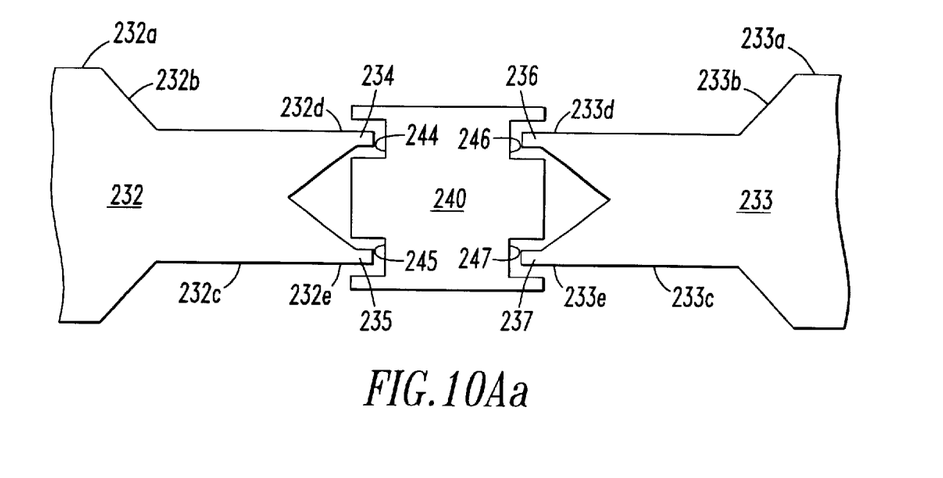
Figure 10A:
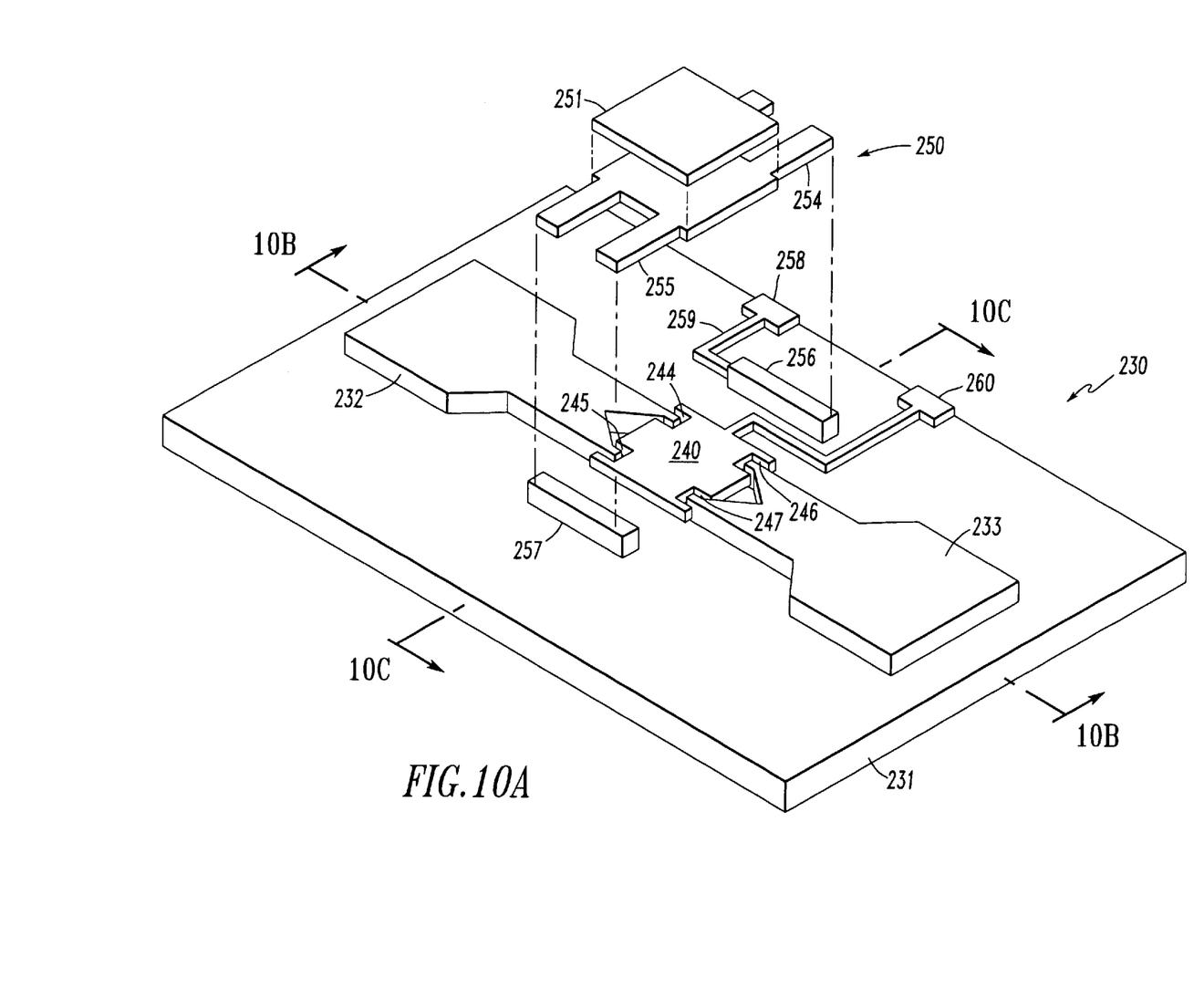
FIG. 10A is an exploded view of another embodiment of the present invention.
Figure 10B:
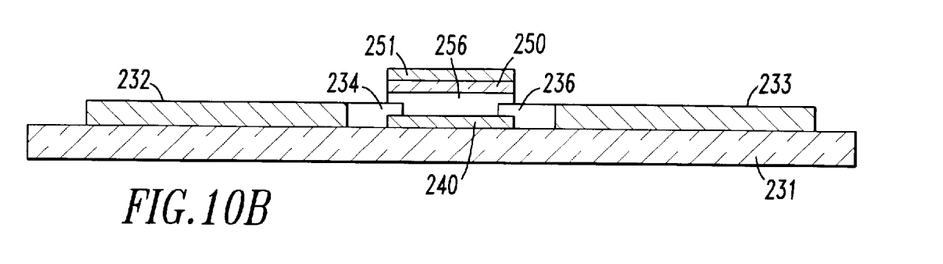
FIG. 10B is a view along line 10B—10B of FIG. 10A.
Figure 10C:
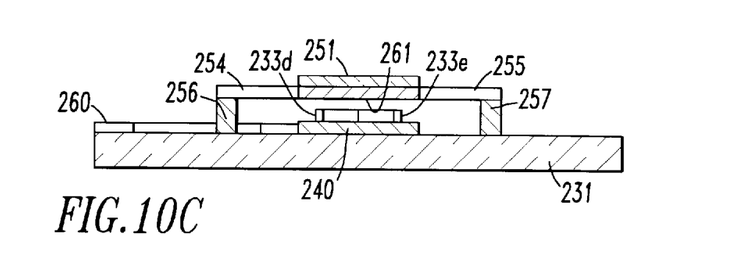
FIG. 10C is a view along line 10C—10C of FIG. 10A.

A significant increase in the ratio of DC electrode area-to-contact area is achieved with the embodiment of the invention illustrated in FIGS. 10A–C. Switch 230 is of the type illustrated in FIG. 4A wherein a contacting member is supported and positioned over both first and second conductors.

More particularly, and with additional reference to FIG. 10Aa, switch 230 includes a substrate 231 upon which is deposited first and second spaced apart conductors 232 and 233. These conductors are mirror images of one another and conductor 232 has a first section which may be a 50 Ohm section 232a, and a tapered section 232b. Section 232b tapers down to a higher Ohm section 232c which, in turn, tapers down to two small contact areas 234 and 235 via tapered sections 232d and 232e, respectively.

Similarly, conductor 233 may be a 50 Ohm section 233a, and includes a tapered section 233b. Section 233b tapers down to a higher Ohm section 233c which, in turn, tapers down to two small contact areas 236 and 237 via tapered sections 233d and 233e, respectively.

A DC control electrode 240 occupies the space between conductors 232 and 233 and further partially surrounds the contact areas 234 to 237. This is accomplished with the provision of four notches 244 to 247, in the sides of electrode 240, as best illustrated in FIG. 10Aa.

Bridge structure 250, including central stiffener portion 251 is suspended over the ends of conductors 232 and 233 by means of arms 254 and 255 connected to respective support members 256 and 257. At least one of these support members 256 and 257 is electrically conducting to serve as a DC ground. Support member 256 is symbolically shown as the ground return, through pad 258. When the switch 230 closes, bridge structure 250 becomes part of the RF circuit and to effect isolation and to reduce potential RF losses, line 259, leading from support member 256 to pad 258, is fabricated to be of extremely high resistance.

A DC control signal applied to pad 260 causes electrostatic attraction between electrode 240 and its opposed electrode 261, constituted by a portion of the underside of bridge structure 260. When the contact areas 234 and 235 are electrically connected to contact areas 236 and 237 by means of the bridge structure 250, switch 230 will conduct RF current between the first and second conductors 232 and 234 with relatively little resistive losses. This low loss feature is attributable to the excellent contact resulting from the large attractive force created by the relatively large control electrode 240.

It is to be noted that the dimensions of the components of the various switch embodiments described herein have been greatly exaggerated for clarity. Typical thicknesses for the various components are, by way of example as follows:

Substrate:—500 $\mu$m

DC electrode:—0.1 $\mu$m

Conductors:—1.0 $\mu$m

Support member:—3.0 $\mu$m

Bridge structure:—1.0 $\mu$m

Central stiffener portion:—1–2 $\mu$m

It is an objective of the switch design that the contacting conductors and bridge structure are fabricated of metals chosen so they have excellent wear properties and conductivity, that is, low electrical resistance. In addition these components should exhibit high thermal conductivity, resistance to oxidation, and the bridge structure metal and conductor metal should have dissimilar melting points. The basic conductor and bridge structure metals may be of silver or gold, by way of example, with suitable respective coatings such as ruthenium, tungsten or molybdenum, to name a few, so as to meet the above objectives.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A MEMS switch comprising:

a substrate member;

first and second spaced-apart conductors deposited on said substrate;

a plurality of support members;

a bridge structure disposed above said substrate and having a plurality of flexible arms connected to respective ones of said support members;

said bridge structure including a central stiffener portion;

at least one control electrode deposited on said substrate for receiving a DC control signal to activate said switch to a closed position;

said bridge structure having an undersurface including at least one metallic area for forming an opposed electrode portion facing said control electrode, for electrostatic attraction upon application of said DC control signal to said control electrode;

said bridge structure, upon said application of said DC control signal, being drawn down, by said electrostatic attraction, to complete an electrical circuit between said first and second conductors; and said central stiffener portion being of a material to resist bending in a manner that, when said bridge structure is drawn down completing said electrical circuit, there is no contact between said control electrode and said opposed electrode portion.

2. A switch according to claim 1 which includes:

two said control electrodes deposited on said substrate and being electrically interconnected;

two said opposed electrode portions on said bridge structure;

said undersurface of said bridge structure being free of any dielectric material in the region of said opposed electrode portions facing said control electrode.

3. A switch according to claim 1 which includes:

only one said control electrode deposited on said substrate;

only one said opposed electrode portion on said bridge structure;

said undersurface of said bridge structure being free of any dielectric material in the region of said opposed electrode portion facing said control electrode.

4. A switch according to claim 1 wherein:

said bridge structure is comprised of an essentially flat metallic bridge member; and said central stiffener portion is deposited on top of said metallic bridge member.

5. A switch according to claim 4 wherein:

said central stiffener portion is a solid oxide.

6. A switch according to claim 5 wherein:

said central stiffener portion is a silicon oxide.

7. A switch according to claim 1 which includes:

two said support members;

said bridge structure includes two said flexible arms connected to respective ones of said support members.

8. A switch according to claim 7 wherein:

said flexible arms are bifurcated.

9. A switch according to claim 1 which includes:

three said support members;

said bridge structure includes two laterally extending flexible arms connected to respective first and second ones of said support members;

said bridge structure including a third arm connected to a third of said support members;

at least said third support member being electrically conducting;

said third support member being electrically integral with said second conductor.

10. A switch according to claim 9 wherein:

at least two of said flexible arms are bifurcated.

11. A switch according to claim 9 wherein:

only one said control electrode is deposited on said substrate;

said first conductor has a distal end under said bridge structure;

said control electrode partially surrounds said distal end of said first conductor.

12. A switch according to claim 9 wherein:

only one said control electrode is deposited on said substrate;

said first conductor has a bifurcated distal end under said bridge structure;

said bifurcated distal end defining spaced-apart conductor segments;

said control electrode being located in the space between said spaced-apart conductor segments.

13. A switch according to claim 9 wherein:

said second conductor has a bifurcated end defining first and second spaced-apart conductor segments;

said first support member being electrically integral with said first conductor segment;

said second support member being electrically integral with said second conductor segment.

14. A switch according to claim 1 wherein:

said first conductor tapers down to two small contact areas;

said second conductor tapers down to two small contact areas;

said control electrode is positioned between said first and second conductors.

15. A switch according to claim 14 wherein:

said control electrode includes four notches;

each said notch partially surrounding a respective one of said contact areas.

16. A switch according to claim 1 which includes:

a plurality of stops positioned on said substrate beneath said bridge structure and being of a height to aid in preventing said bridge structure from touching said control electrode, when said bridge structure is drawn down.

\* \* \* \* \*